US007992536B2

(12) United States Patent
Ikeya et al.

(10) Patent No.: US 7,992,536 B2
(45) Date of Patent: Aug. 9, 2011

(54) DIRECT FUEL INJECTION DIESEL ENGINE

(75) Inventors: Kenichiro Ikeya, Saitama (JP);
Yukihisa Yamaya, Saitama (JP);
Nobuhiko Sasaki, Saitama (JP);
Tatsuya Uchimoto, Saitama (JP);
Yutaka Tajima, Saitama (JP);
Mitsuhiro Shibata, Saitama (JP);
Hiroshi Sono, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 405 days.

(21) Appl. No.: 12/305,880

(22) PCT Filed: Apr. 11, 2007

(86) PCT No.: PCT/JP2007/057988
§ 371 (c)(1),
(2), (4) Date: Dec. 19, 2008

(87) PCT Pub. No.: WO2008/001534
PCT Pub. Date: Jan. 3, 2008

(65) Prior Publication Data
US 2010/0186709 A1    Jul. 29, 2010

(30) Foreign Application Priority Data

Jun. 26, 2006  (JP) ................................. 2006-175597

(51) Int. Cl.
*F02F 3/26*    (2006.01)
*F02F 3/28*    (2006.01)
(52) U.S. Cl. ........................................ 123/276; 123/307
(58) Field of Classification Search .................. 123/276, 123/279, 280, 285, 305, 307, 193.6; 701/103
See application file for complete search history.

(56) References Cited

U.S. PATENT DOCUMENTS

| 6,739,309 B2 * | 5/2004 | Hiraya et al. ................. 123/279 |
| 2010/0006061 A1 * | 1/2010 | Shibata et al. ................. 123/307 |

FOREIGN PATENT DOCUMENTS

| DE | 102 60 938 A1 | 7/2003 |
| EP | 2 034 156 A1 | 3/2009 |
| JP | 62-255520 A | 11/1987 |
| JP | 62-288311 A | 12/1987 |
| JP | 63-016124 A | 1/1988 |
| JP | 2003-328759 A | 11/2003 |
| JP | 2004-011441 A | 1/2004 |
| JP | 2004-270476 A | 9/2004 |
| JP | 2005-155563 A | 6/2005 |
| WO | WO-2007/148467 A1 | 12/2007 |

* cited by examiner

*Primary Examiner* — Mahmoud Gimie
(74) *Attorney, Agent, or Firm* — Arent Fox LLP

(57) ABSTRACT

In a direct fuel injection diesel engine equipped with a pentroof-shaped piston, when fuel is injected into a cavity (25) recessed in a central part of a piston (13), for which the height of a top face changes in the circumferential direction, from a fuel injection point (Oinj) of a fuel injector disposed on a piston central axis along a plurality of fuel injection axes (Li1,Li2), if a cross-section of the cavity (25) passing along the fuel injection axis (Li1,Li2) is defined as a fuel injection cross-section (Sn), a cross-sectional shape (see shaded portion) of the cavity (25) defined by first to third specific points (An, Bn, Cn) on the fuel injection cross-section (Sn) is set so as to be substantially equal for each fuel injection cross-section (Sn). By so doing, the conditions in which fuel and air are mixed in each fuel injection cross-section (Sn) can be made uniform, the engine output can be improved, and harmful exhaust substances can be reduced.

6 Claims, 8 Drawing Sheets

CROSS-SECTION IN DIRECTION INTERSECTING PISTON PIN AT 60°

US 7,992,536 B2

DIRECT FUEL INJECTION DIESEL ENGINE

CROSS-REFERENCE TO RELATED APPLICATION

This application is a National Stage entry of International Application No. PCT/JP2007/057988, filed Apr. 11, 2007. The disclosure of the prior application is hereby incorporated herein in its entirety by reference.

TECHNICAL FIELD

The present invention relates to a direct fuel injection diesel engine that includes a piston for which the height of a top face changes in the circumferential direction, and a fuel injector for injecting fuel from on a piston central axis along a plurality of fuel injection axes spaced in the circumferential direction into a cavity recessed in a central part of the piston.

BACKGROUND ART

In general, the top face of a piston of a direct fuel injection diesel engine is formed as a flat face, but a direct fuel injection diesel engine for which the top face of a piston projects in a pentroof shape is known from Patent Publication 1 below.

When a cavity is recessed in a top face of a pentroof-shaped piston, the height of an opening of the cavity changes in the circumferential direction. Therefore, if the height of a bottom wall portion of the cavity is made uniform in the circumferential direction, the depth of a peripheral wall portion of the cavity changes in the circumferential direction, and the conditions in which air and fuel injected from a fuel injector are mixed become nonuniform in the circumferential direction, thus giving rise to the problems that the engine output decreases and harmful exhaust substances increase.

In order to solve such problems, in the arrangement described in Patent Publication 1, the height of the bottom wall portion of the cavity is changed so as to follow the change in height of the opening of the cavity, and the depth of the peripheral wall portion of the cavity is made uniform in the circumferential direction, thereby making the conditions in which fuel and air are mixed in the cavity uniform in the circumferential direction.

Patent Publication 1: Japanese Patent Application Laid-open No. 62-255520

DISCLOSURE OF INVENTION

Problems to be Solved by the Invention

In the above-mentioned conventional arrangement, although the depth of the peripheral wall portion of the cavity becomes uniform in the circumferential direction, since the cross-sectional shape of the cavity passing along each fuel injection axis changes according to the height of the opening of the cavity, it is not always possible to make the conditions in which fuel and air are mixed uniform in the circumferential direction of the cavity.

The present invention has been accomplished in the light of the above-mentioned circumstances, and it is an object thereof to enable uniform mixing of fuel and air in all directions of the circumferential direction of a cavity in a direct fuel injection diesel engine equipped with a pentroof-shaped piston.

Means for Solving the Problems

In order to attain the above object, according to a first aspect of the present invention, there is provided a direct fuel injection diesel engine comprising a piston for which the height of a top face changes in the circumferential direction, and a fuel injector for injecting fuel from on a piston central axis along a plurality of fuel injection axes spaced in the circumferential direction into a cavity recessed in a central part of the piston, characterized in that a cross-section of the cavity that passes along an (n)th fuel injection axis is a fuel injection cross-section $S_n$, a point at which the fuel injection cross-section $S_n$ intersects a peripheral edge of an opening of the cavity is a first specific point $A_n$, a second specific point $B_n$ is present on a line that passes through the first specific point $A_n$ and is parallel to a lower face of a cylinder head in the fuel injection cross-section $S_n$, a third specific point $C_n$ is present on a bottom wall portion of the cavity in the fuel injection cross-section $S_n$, the second specific point $B_n$ is positioned closer to the piston central axis than is the first specific point $A_n$, the third specific point $C_n$ is positioned closer to the piston central axis than is a position where the bottom wall portion of the cavity has a maximum outer diameter, and a cross-sectional shape surrounded by a pathway $A_nB_n$ connecting the first and second specific points $A_n$ and $B_n$ via a line along the lower face of the cylinder head in the fuel injection cross-section $S_n$, a pathway $A_nC_n$ connecting the first and third specific points $A_n$ and $C_n$ along a wall face of the cavity in the fuel injection cross-section $S_n$, and a pathway $B_nC_n$ connecting the second and third specific points $B_n$ and $C_n$ via the shortest straight line is substantially identical for each fuel injection cross-section $S_n$.

According to a second aspect of the present invention, in addition to the first aspect, the fuel injection cross-section $S_n$ is substantially perpendicular to the top face of the piston.

According to a third aspect of the present invention, in addition to the first or second aspect, a top portion protruding toward the opening of the cavity is formed in the middle of the wall face of the cavity, and the third specific point $C_n$ is positioned on the boundary of the top portion and the bottom wall portion connected to the radially outer side thereof.

According to a fourth aspect of the present invention, in addition to any one of the first to third aspects, a cross-sectional shape of the cavity that passes through any point in the circumferential direction of the cavity and a fuel injection point of the fuel injector present on the piston central axis and is perpendicular to the top face of the piston is substantially identical to the cross-sectional shape of each fuel injection cross-section $S_n$.

According to a fifth aspect of the present invention, in addition to any one of the first to fourth aspects, fuel collision angles at which the plurality of fuel injection axes intersect the wall face of the cavity are identical.

According to a sixth aspect of the present invention, in addition to any one of the first to fifth aspects, the distances from the fuel injection point of the fuel injector to fuel collision points where the plurality of fuel injection axes intersect the wall face of the cavity are identical.

EFFECTS OF THE INVENTION

In accordance with the first aspect of the present invention, when fuel is injected into the cavity recessed in the central part of the piston, for which the height of the top face changes in the circumferential direction, from the fuel injector disposed on the piston central axis along the plurality of fuel injection axes, if a cross-section of the cavity passing along an (n)th fuel injection axis is defined as a fuel injection cross-section $S_n$, since the cross-sectional shape of the cavity defined by first to third specific points $A_n$, $B_n$, and $C_n$ on the fuel injection cross-section $S_n$ is set so as to be substantially equal for each fuel injection cross-section Sn, it is possible to make the conditions in which fuel and air are mixed in each fuel injection cross-section Sn uniform, thus improving the engine output and reducing harmful exhaust substances. Furthermore, since the angle of an opening edge of the cavity in a portion where the top face of the piston is inclined is not made acute, it is also advantageous in terms of thermal stress resistance.

Furthermore, in accordance with the second aspect of the present invention, by making the fuel injection cross-section Sn substantially perpendicular to the top face of the piston, it is possible to optimize the mixing of air and fuel microparticles diffusing in the circumferential direction along the top face of the piston.

Moreover, in accordance with the third aspect of the present invention, since the third specific point Cn is positioned on the boundary between the top portion formed in the middle of the wall face of the cavity and the bottom wall portion connected to the radially outer side thereof, the third specific point Cn is made to be as close to the piston central axis as possible, the proportion of each fuel injection cross-section Sn occupied by the cross-sectional shape defined by the first to third specific points An, Bn, and Cn is increased, and it is thus possible to minimize variations in the conditions in which fuel and air are mixed in each cross-section in the circumferential direction of the cavity.

Furthermore, in accordance with the fourth aspect of the present invention, since not only is the cavity cross-sectional shape that passes through the fuel injection point of the fuel injector present on the piston central axis and is perpendicular to the top face of the piston set so as to be substantially equal for each fuel injection cross-section Sn, but also the cavity cross-sectional shape that passes through a given point in the circumferential direction of the cavity displaced from the fuel injection cross-section Sn is set so as to be substantially equal, it is possible to make the conditions in which air and fuel are mixed at each position of the circumferential direction of the cavity yet more uniform.

Moreover, in accordance with the fifth aspect of the present invention, since the fuel collision angle at which each fuel injection axis intersects the wall face of the cavity is set so as to be equal, it is possible to make the conditions in which air and fuel are mixed at each position of the circumferential direction of the cavity yet more uniform.

Furthermore, in accordance with the sixth aspect of the present invention, since the distance between the fuel injection point of the fuel injector and the fuel collision point of the wall face of the cavity is set so as to be equal for each fuel injection axis, it is possible to make the conditions in which air and fuel are mixed at each position of the circumferential direction of the cavity yet more uniform.

EXPLANATION OF REFERENCE NUMERALS AND SYMBOLS

13 Piston
16 Cylinder head
23 Fuel injector
25 Cavity
25c Bottom wall portion
25d Top portion
Li1 Fuel injection axis
Li2 Fuel injection axis
Lp Piston central axis
Oinj Fuel injection point
P1 Fuel collision point
P2 Fuel collision point
α1 Fuel collision angle
α2 Fuel collision angle

BEST MODE FOR CARRYING OUT THE INVENTION

A mode for carrying out the present invention is explained by reference to the attached drawings.

Embodiment 1

FIG. 1 to FIG. 8 show an embodiment of the present invention.

Figure 1:
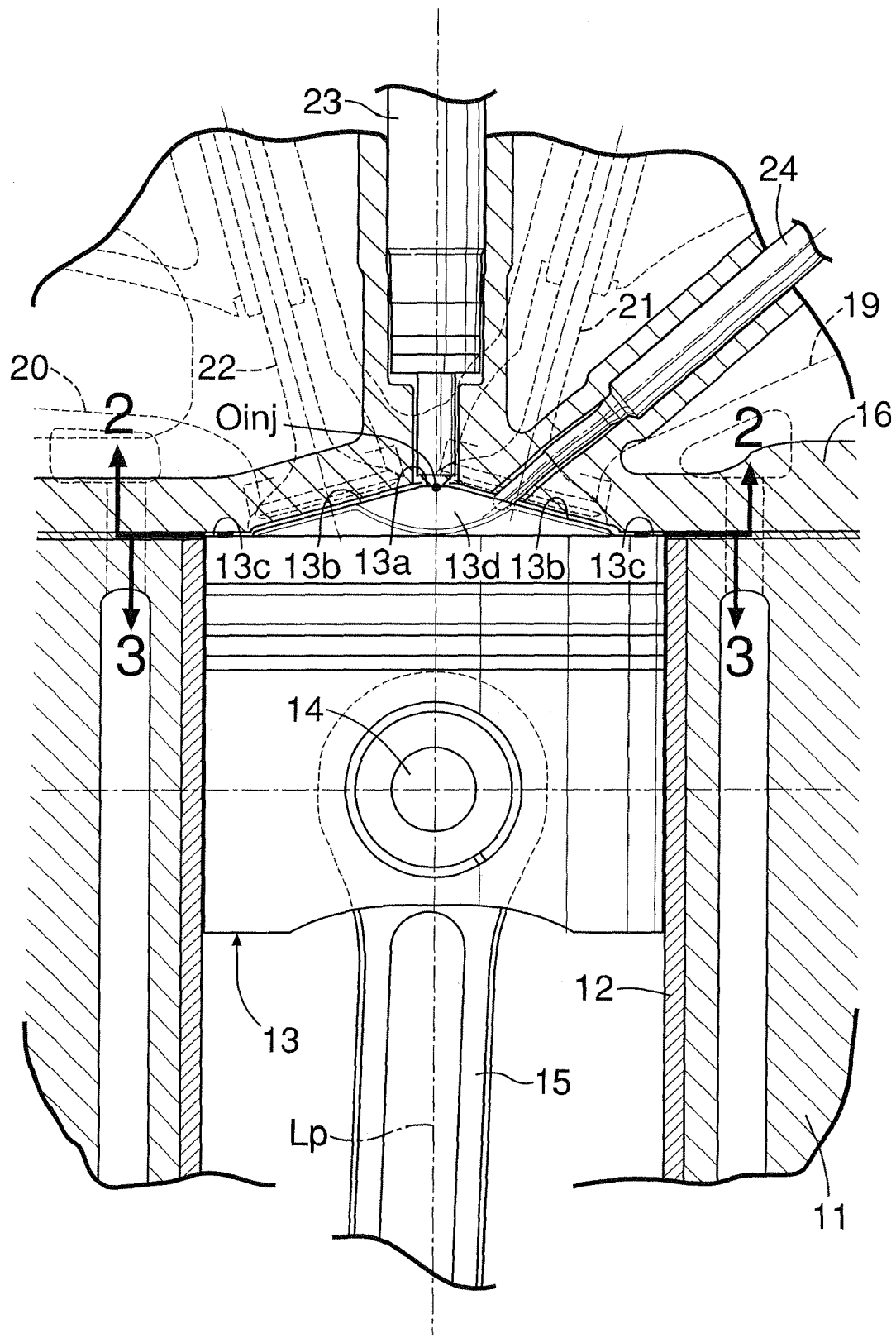
FIG. 1 is a vertical sectional view of an essential part of a diesel engine (first embodiment).
Figure 2:
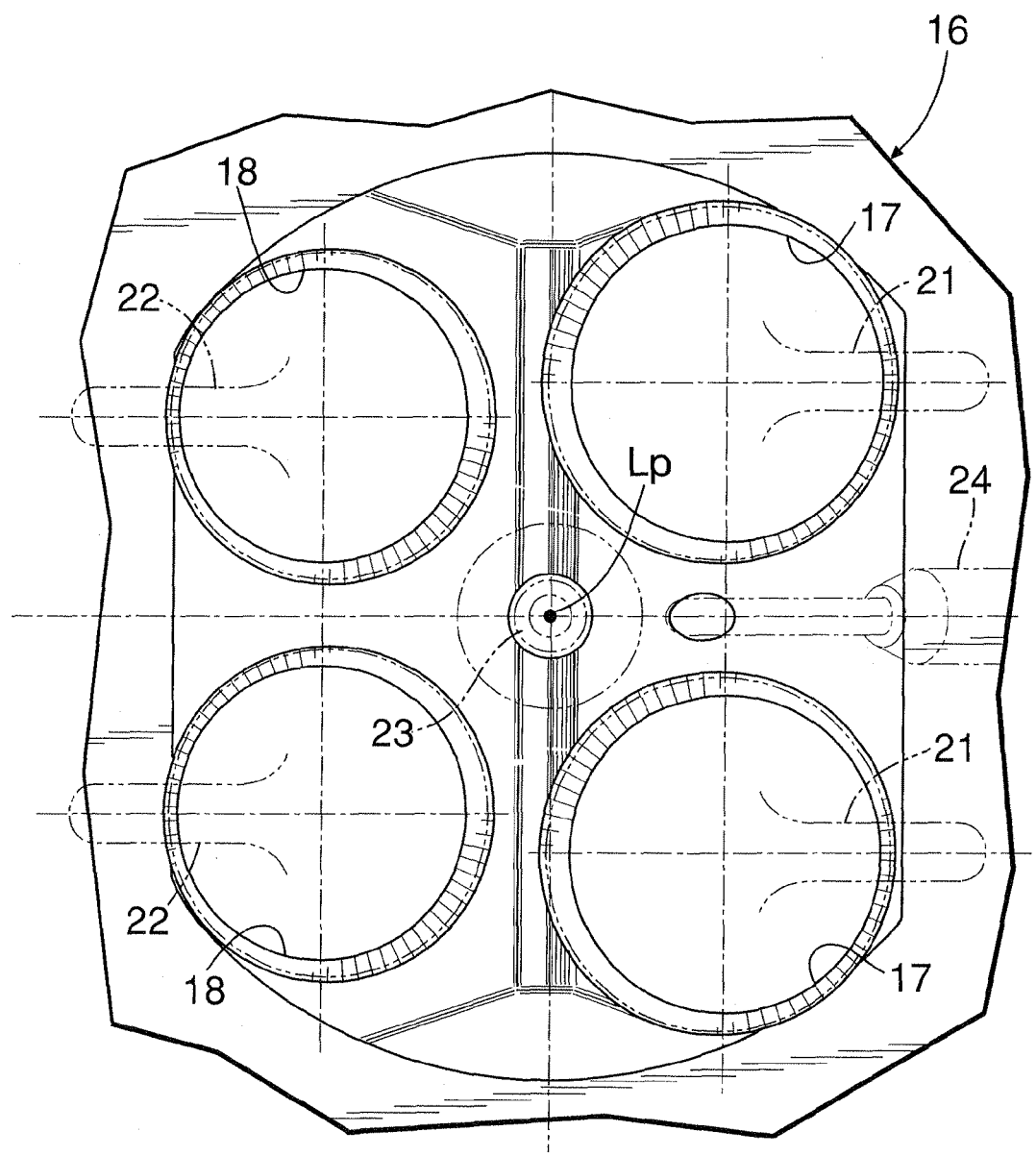
FIG. 2 is a view from arrowed line 2-2 in FIG. 1 (first embodiment).
Figure 3:
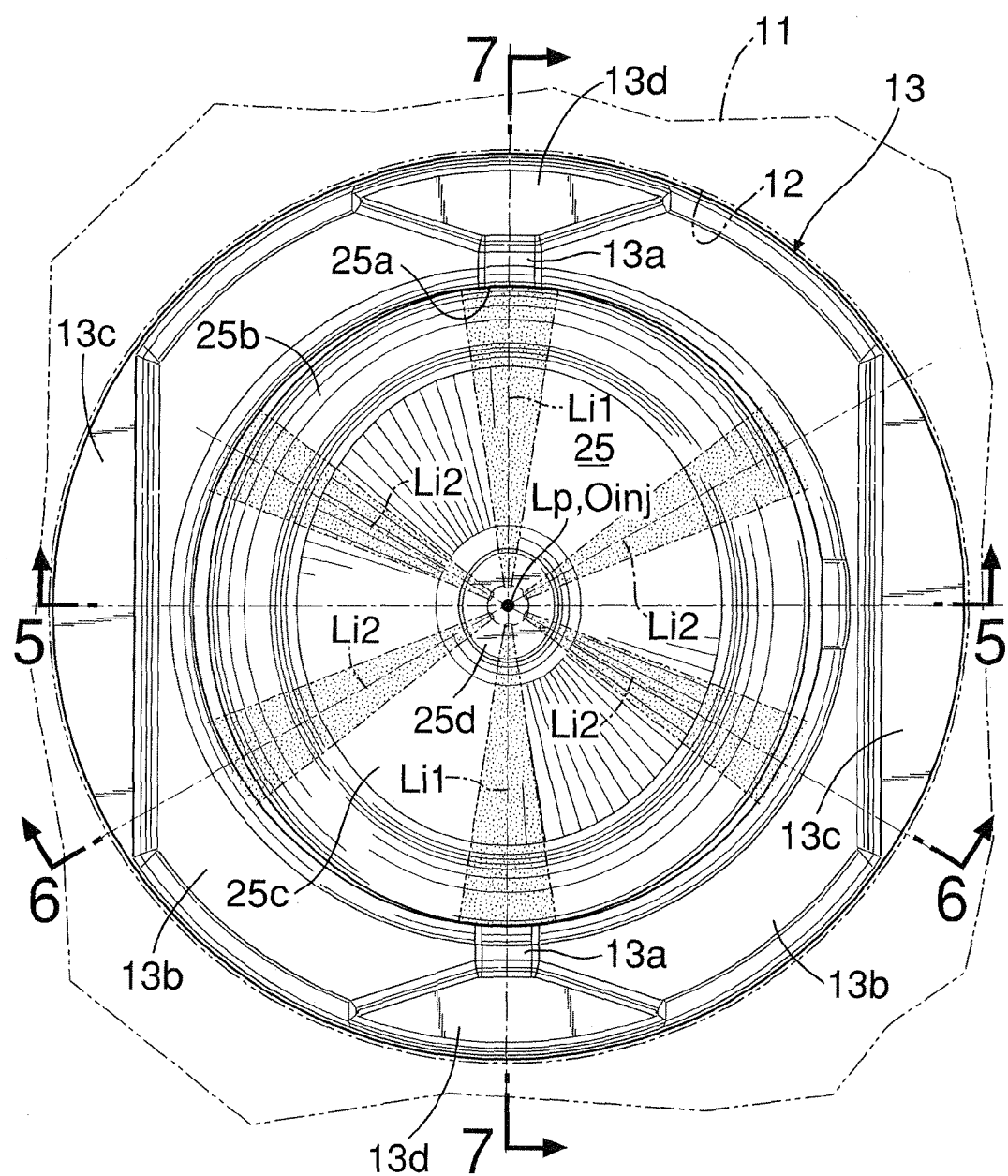
FIG. 3 is a view from arrowed line 3-3 in FIG. 1 (first embodiment).

As shown in FIG. 1 to FIG. 3, a direct fuel injection type diesel engine includes a piston 13 slidably fitted into a cylinder 12 formed in a cylinder block 11, and the piston 13 is connected to a crankshaft (not illustrated) via a piston pin 14 and a connecting rod 15. Two intake valve holes 17 and 17 and two exhaust valve holes 18 and 18 facing a top face of the piston 13 open in a lower face of a cylinder head 16, which is joined to an upper face of the cylinder block 11, an intake port 19 communicates with the intake valve holes 17 and 17, and an exhaust port 20 communicates with the exhaust valve holes 18 and 18. The intake valve holes 17 and 17 are opened and closed by intake valves 21 and 21, and the exhaust valve holes 18 and 18 are opened and closed by exhaust valves 22 and 22. A fuel injector 23 is provided so as to be positioned on a piston central axis Lp, and a glow plug 24 is provided so as to be adjacent to the fuel injector 23.

Figure 4:
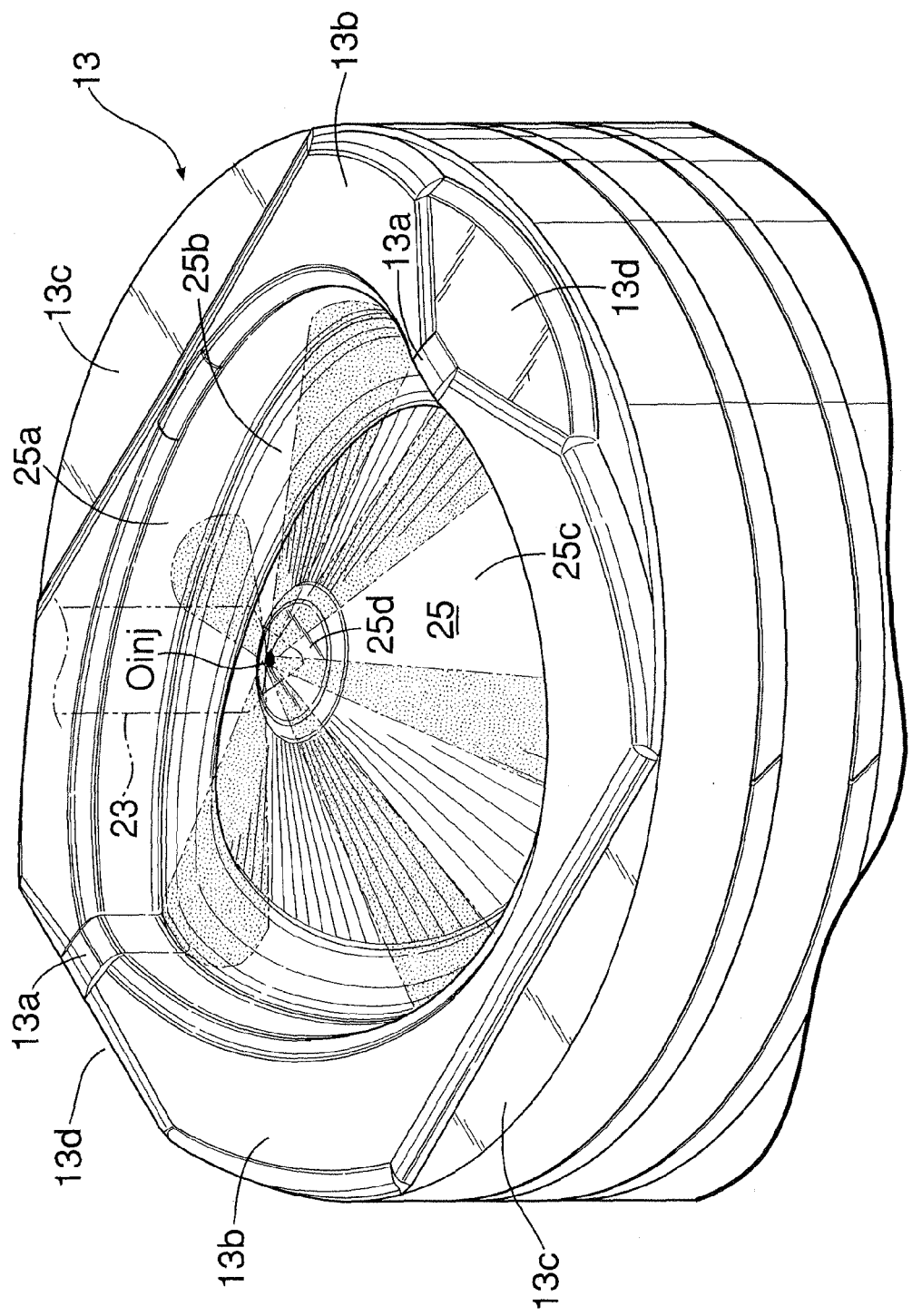
FIG. 4 is a perspective view of an upper part of a piston (first embodiment).

As is clear from FIG. 1 and FIG. 4, the top face of the piston 13 and the lower face of the cylinder head 16 facing it are not flat but are inclined in a pentroof shape with a triangular cross-section, and due to this shape it is possible to reduce the degree of curvature of the intake port 19 and the exhaust port 20, guarantee a diameter for the intake valve holes 17 and 17 and the exhaust valve holes 18 and 18, and enhance the intake efficiency and the exhaust efficiency.

A cavity 25 with the piston central axis Lp as its center is recessed in the top face of the piston 13. Formed radially outside the cavity 25 are a pair of inclined faces 13b and 13b inclined downward to the intake side and the exhaust side from top portions 13a and 13a extending linearly parallel to the piston pin 14, a pair of flat faces 13c and 13c formed in the vicinity of the lower end of the inclined faces 13b and 13b so as to be perpendicular to the piston central axis Lp, and a pair of cutout portions 13d and 13d formed by cutting out opposite ends of the top portions 13a and 13a so as to be flat.

The fuel injector 23, which is disposed along the piston central axis Lp, injects fuel in six directions spaced at intervals of 60° in the circumferential direction with a fuel injection point Oinj, which is an imaginary point on the piston central axis Lp, as a center. Among six fuel injection axes, two first fuel injection axes Li1 overlap the piston pin 14 when viewed in the piston central axis Lp direction, and the other four second fuel injection axes Li2 intersect the piston pin 14 direction at angles of 60°. Furthermore, when viewed from a direction perpendicular to the piston central axis Lp, the six first and second fuel injection axes Li1 and Li2 are inclined obliquely downward, the degree of downward inclination being small for the first fuel injection axes Li1 and large for the second fuel injection axes Li2 (see FIG. 6 and FIG. 7).

An injection point at which the fuel injector 23 actually injects fuel is slightly displaced radially outward from the piston central axis Lp, but the fuel injection point Oinj is defined as a point where the first and second fuel injection axes Li1 and Li2 intersect the piston central axis Lp.

Figure 5:
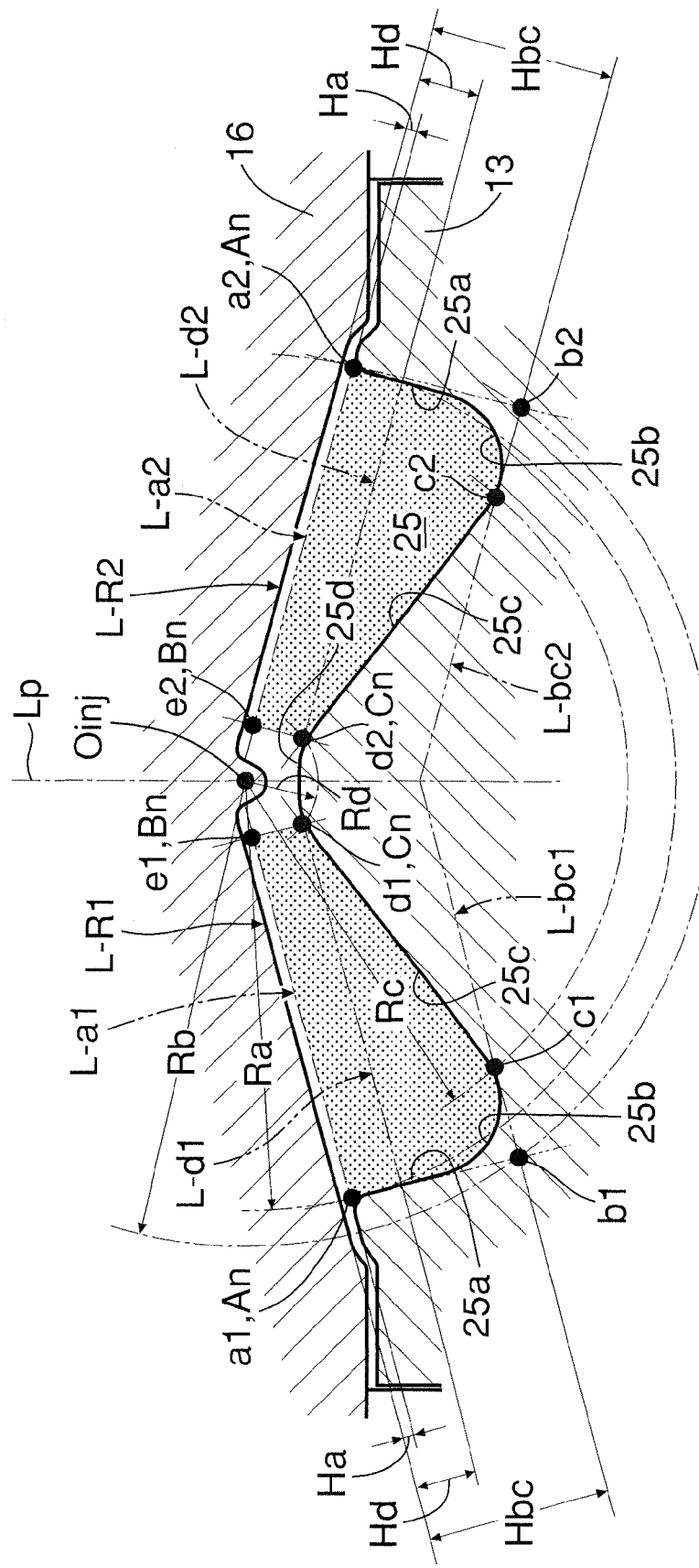
FIG. 5 is a sectional view along line 5-5 in FIG. 3 (first embodiment).

The cross-sectional shape of the cavity 25 is now explained in detail by reference to FIG. 5 to FIG. 7. FIG. 5 is a cross-section (cross-section containing second fuel injection axis Li2) in a direction perpendicular to the piston pin 14, FIG. 6 is a section in a direction that intersects the piston pin 14 at 60°, and FIG. 7 is a cross-section (cross-section containing first fuel injection axis Li1) in a direction along the piston pin 14.

Figure 6:
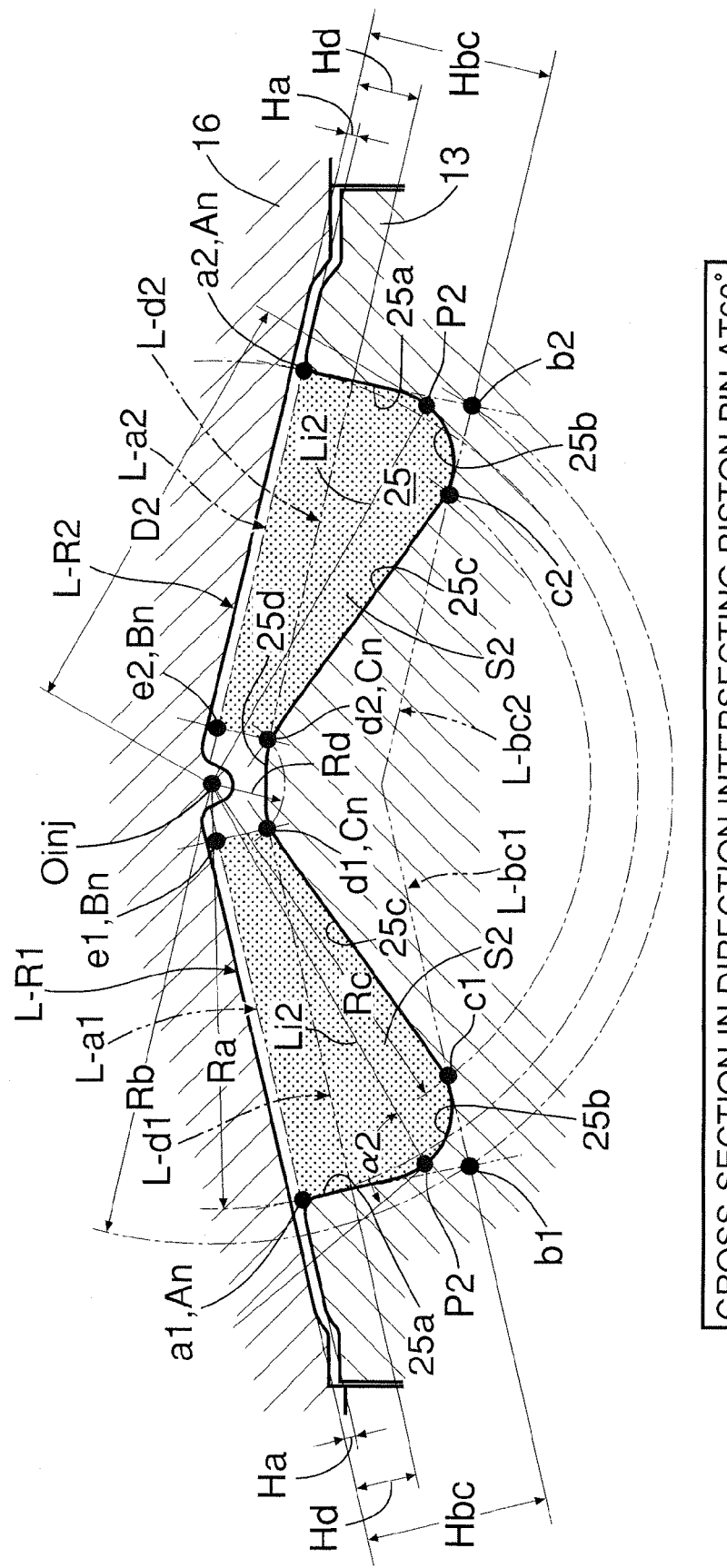
FIG. 6 is a sectional view along line 6-6 in FIG. 3 (first embodiment).
Figure 7:
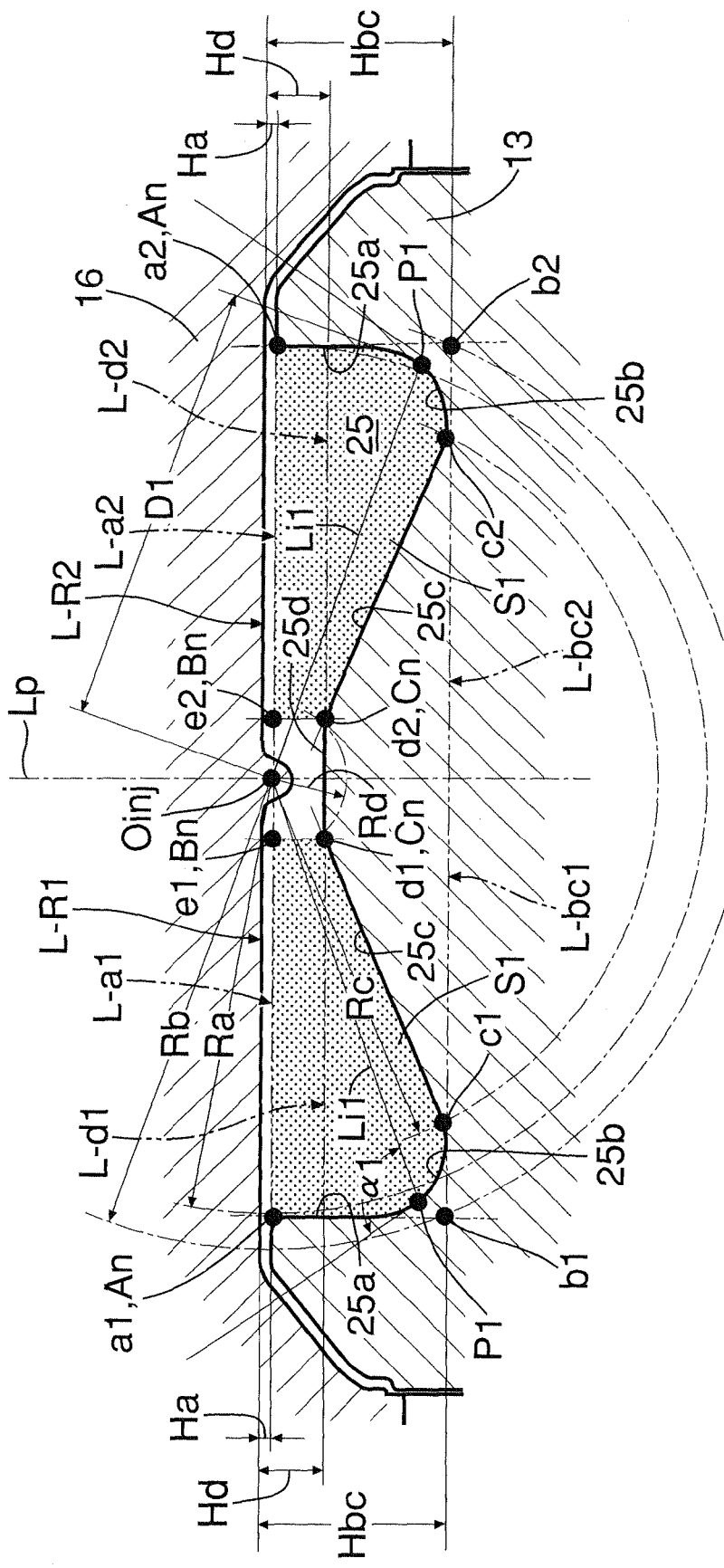
FIG. 7 is a sectional view along line 7-7 in FIG. 3 (first embodiment).

It is important to note here that the cross-sections of FIG. 5 to FIG. 7 are all cross-sections in a direction that passes through the fuel injection point Oinj and is perpendicular to the top face of the piston 13. With regard to the cross-section in a direction perpendicular to piston pin 14 in FIG. 5 and the cross-section in the piston pin 14 direction in FIG. 7, their cross-sections are perpendicular to the top face of the piston 13 and contain the piston central axis Lp. On the other hand, the cross-section in a direction that intersects the piston pin 14 at 60° in FIG. 6 is a cross-section that passes along the second fuel injection axis Li2, is perpendicular to the top face of the piston 13 (that is, inclined faces 13b and 13b), and does not contain the piston central axis Lp. That is, in FIG. 3, the cross-section along line 5-5 and the cross-section along line 7-7 are perpendicular to the paper surface, but the cross-section along line 6-6 is not perpendicular to the paper surface and instead is perpendicular to the inclined faces 13b and 13b of the piston 13.

The aspect of the present embodiment is that in a given cross-section that passes through the fuel injection point Oinj and is perpendicular to the top face of the piston 13, the shape of the cavity 25 is substantially the same. The cross-sectional shape of the cavity 25 is divided into two, that is, left and right portions, sandwiching the fuel injection point Oinj; the two portions are substantially linearly connected in the cross-section in the piston pin 14 direction in FIG. 7, but are connected in an angled shape in accordance with the pentroof shape of the piston 13 in the cross-section in a direction perpendicular to the piston pin 14 in FIG. 5 and in the cross-section in a direction that intersects the piston pin 14 at 60° in FIG. 6. However, an essential part of the cross-sectional shape of the cavity 25, that is, the shaded portions in FIG. 5 to FIG. 7, are exactly the same.

As is clear from FIG. 5 to FIG. 7, the cavity 25 formed with the piston central axis Lp as a center is formed from a peripheral wall portion 25a extending linearly downward from the top face of the piston 13, a curved wall portion 25b curving in a concave shape from the lower end of the peripheral wall portion 25a toward the piston central axis Lp, a bottom wall portion 25c extending linearly obliquely upward from the radially inner end of the curved wall portion 25b toward the piston central axis Lp, and a top portion 25d connected to the radially inner end of the bottom wall portion 25c on the piston central axis Lp.

Lines extending spaced only by a distance Ha downward from, and parallel to, lines L-R1 and L-R2 denoting the lower face of the cylinder head 16 facing the cavity 25 are defined as piston top face baselines L-a1 and L-a2. Similarly, lines extending spaced only by a distance Hbc downward from, and parallel to, the lines L-R1 and L-R2 denoting the lower face of the cylinder head 16 are defined as cavity bottom face baselines L-bc1 and L-bc2, and lines extending spaced only by a distance Hd downward from, and parallel to, the lines L-R1 and L-R2 denoting the lower face of the cylinder head 16 are defined as cavity top portion baselines L-d1 and L-d2.

Intersection points of an arc having a radius Ra and the fuel injection point Oinj as a center with the piston top face baselines L-a1 and L-a2 are defined as a1 and a2. Similarly, intersection points of an arc having a radius Rb and the fuel injection point Oinj as a center with the cavity bottom face baselines L-bc1 and L-bc2 are defined as b1 and b2, intersection points of an arc having a radius Rc and the fuel injection point Oinj as a center with the cavity bottom face baselines L-bc1 and L-bc2 are defined as c1 and c2, and intersection points of an arc having a radius Rd and the fuel injection point Oinj as a center with the cavity top portion baselines L-d1 and L-d2 are defined as d1 and d2. Intersection points e1 and e2 are points at which perpendicular lines from the intersection points d1 and d2 to the piston top face baselines L-a1 and L-a2 intersect the piston top face baselines L-a1 and L-a2.

The peripheral wall portion 25a of the cavity 25 is on the straight lines a1b1 and a2b2 the bottom wall portion 25c of the cavity 25 coincides with the straight lines c1d1 and c2d2 and the curved wall portion 25b of the cavity 25 smoothly connects the straight lines a1b1 and a2b2 and the straight lines c1d1 and c2d2.

The shape of the cavity 25 is set so that the shaded cross-sectional shape defined by the intersection points a1, c1, d1, and e1 or the intersection points a2, c2, d2, and e2 is equal for any cross-section that passes through the fuel injection point Oinj and is perpendicular to the top face of the piston 13.

The intersection points a1 and a2 correspond to a first specific point An of the present invention, the intersection points e1 and e2 correspond to a second specific point Bn of the present invention, and the intersection points d1 and d2 correspond to a third specific point Cn of the present invention.

With regard to the cross-sections that pass along the first and second fuel injection axes Li1 and Li2 shown in FIG. 6 and FIG. 7, the shaded portion in the cross-section (fuel injection cross-section S1) in the piston pin 14 direction shown in FIG. 7 and the shaded portion in the cross-section (fuel injection cross-section S2) that intersects the piston pin 14 at 60° shown in FIG. 6 have an identical shape.

In the cross-section in the piston pin 14 direction shown in FIG. 7, a point at which the first fuel injection axis Li1 intersects the cavity 25 is defined as a fuel collision point P1, and in the cross-section in a direction that intersects the piston pin 14 at 60° as shown in FIG. 6, a point at which the second fuel injection axis Li2 intersects the cavity 25 is defined as a fuel collision point P2. The two fuel collision points P1 and P2 are present at the same position of the shaded cross-sections having identical shapes. Therefore, the position of the fuel collision point P2 is lower than the position of the fuel collision point P1, and the second fuel injection axis Li2 extending from the fuel injection point Oinj injects fuel further downward than the first fuel injection axis Li1.

A distance D1 from the fuel injection point Oinj to the fuel collision point P1 coincides with a distance D2 from the fuel injection point Oinj to the fuel collision point P2. Furthermore, a fuel collision angle α1 formed by a tangent to the cavity 25 at the fuel collision point P1 and the first fuel injection axis Li1 is the same as a fuel collision angle α2 formed by a tangent to the cavity 25 at the fuel collision point P2 and the second fuel injection axis Li2.

As hereinbefore described, in accordance with the present embodiment, with regard to any cross-section that passes through the fuel injection point Oinj and is perpendicular to the top face of the piston 13, the cross-sectional shape of the cavity 25, excluding a very small part (region surrounded by intersection points e1, d1, d2, and e2) in the vicinity of the fuel injection point Oinj, is formed so as to be identical. In particular, with regard to the two cross-sections (see FIG. 6 and FIG. 7) containing the first and second fuel injection axes Li1 and Li2, since the cross-sectional shape of the cavity 25 is formed so as to be identical and, moreover, the distances D1 and D2 from the fuel injection point Oinj to the fuel collision points P1 and P2 in the two cross-sections are set so as to be equal and the fuel collision angles α1 and α2 of the fuel collision points P1 and P2 are set so as to be equal, the conditions in which air and fuel are mixed in each portion of the cavity 25 are made uniform in the circumferential direction, thus improving the combustion conditions for the gas mixture, increasing the engine output, and reducing harmful exhaust substances.

Furthermore, in the cross-sections in which the top face of the piston 13 is inclined as shown in FIG. 5 and FIG. 6, since the angle formed by the edge (portion at intersection point a2) of the opening of the cavity 25 is not made acute compared with a case in which the top face of the piston 13 is flat as shown in FIG. 7, it is possible to reduce the thermal load of this portion and improve the heat resistance.

Furthermore, among the cross-sections of the cavity 25 that pass through the fuel injection point Oinj, a cross-section that greatly affects the mixing of fuel and air is not a cross-section containing the piston central axis Lp but a cross-section that is perpendicular to the top face of the piston 13. This is because diffusion of fuel microparticles in the circumferential direction within the cavity 25 occurs in a direction along the top face of the piston 13, and a cross-section that is perpendicular to the diffusion direction is a cross-section that is perpendicular to the top face of the piston 13. In the present embodiment, since, in any cross-section that passes through the fuel injection point Oinj and is perpendicular to the top face of the piston 13, the shape of the cavity 25 is made to be substantially identical, it is possible to make the conditions in which fuel and air are mixed in each portion of the cavity 25 yet more uniform.

Moreover, since the intersection points d1 and d2 are positioned on a boundary between the bottom wall portion 25c and the top portion 25d of the cavity 25, it is possible to make the intersection points d1 and d2 and the intersection points e1 and e2 as close to the piston central axis Lp as possible, increase the proportion of the shaded cross-sectional shape occupying each fuel injection cross-section Sn, and minimize variation of the conditions in which fuel and air are mixed in each cross-section in the circumferential direction of the cavity 25.

Figure 8:
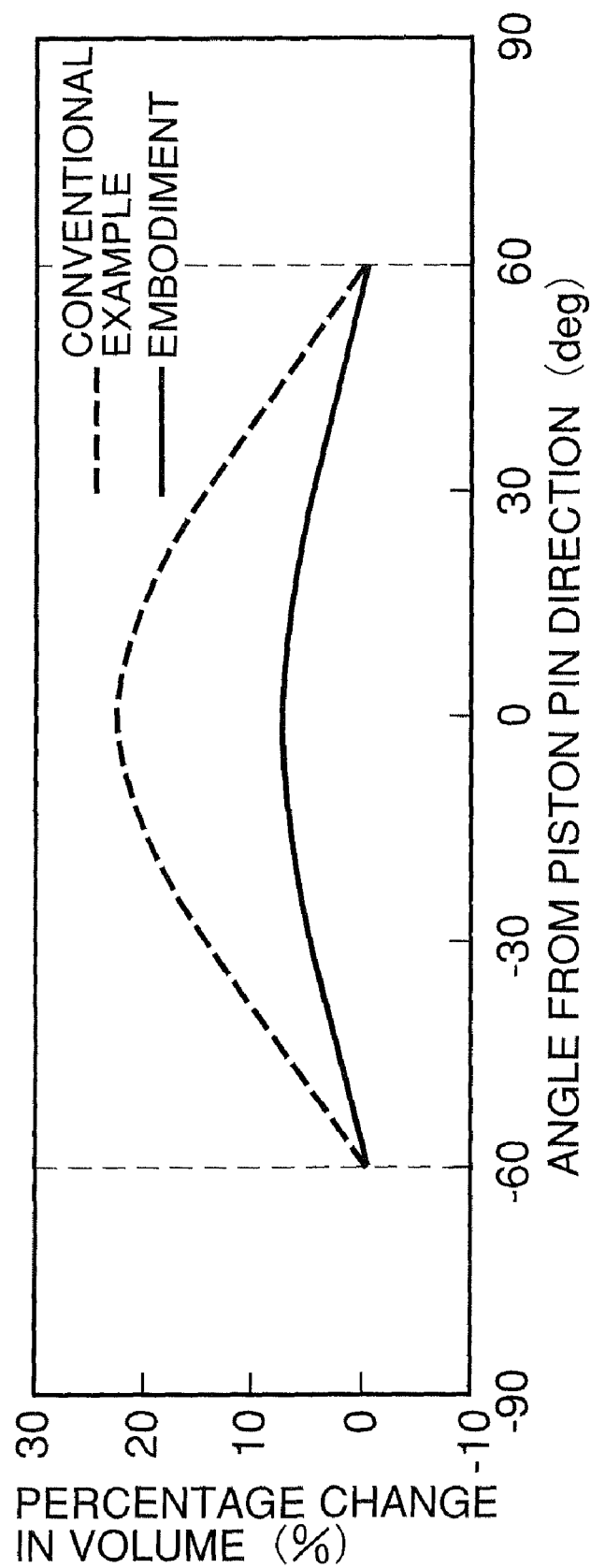
FIG. 8 is a graph showing percentage change of cavity volume in a range of 30° to both left and right of the fuel injection axis when the direction of the fuel injection axis is changed in the circumferential direction (first embodiment).

FIG. 8 shows the percentage change of volume of the cavity 25 in a range of 30° to both left and right of the fuel injection axis when the direction of the fuel injection axis is moved in a range of 60° to both left and right of the piston central axis Lp with the piston pin 14 direction as a reference) (0°). The solid line corresponds to the present embodiment, in which the cross-sectional shape of the cavity 25 is identical for any cross-section that passes through the fuel injection point Oinj and is perpendicular to the top face of the piston 13, and the broken line corresponds to a conventional example (invention described in Patent Publication 1 above). As is clear from this figure, in the conventional example, the percentage change of volume exceeds 20%, whereas in the present embodiment the percentage change of volume is less than 10%.

In the invention of the present application, the shape of the cavity 25 is substantially identical for any cross-section that passes through the fuel injection point Oinj and is perpendicular to the top face of the piston 13, and the shape of the cavity 25 being substantially identical referred to here is defined as allowing a slight change in shape such that the percentage change of volume is less than 10%, for example, a case in which the fuel injection cross-section Sn passes along the piston central axis Lp or a case in which the fuel injection cross-section Sn is tilted slightly from a state in which it is perpendicular to the top face of the piston 13.

An embodiment of the present invention is explained above, but the present invention may be modified in a variety of ways as long as the modifications do not depart from the sprit and scope thereof.

For example, in the present embodiment, the first fuel injection axis Li1 is oriented in the direction in which the height of the top face of the piston 13 is the highest, but it is not always necessary for it to be oriented in the highest direction.

Furthermore, in the present embodiment, the fuel injector 23 injects fuel in six directions spaced at intervals of 60°, but the direction of injection of fuel is not limited to six directions.

The invention claimed is:

1. A direct fuel injection diesel engine comprising a piston (13) for which the height of a top face changes in the circumferential direction, and a fuel injector (23) for injecting fuel from on a piston central axis (Lp) along a plurality of fuel injection axes (Li1, Li2) spaced in the circumferential direction into a cavity (25) recessed in a central part of the piston (13), characterized in that a cross-section of the cavity (25) that passes along an (n)th fuel injection axis (Li1, Li2) is a fuel injection cross-section Sn, a point at which the fuel injection cross-section Sn intersects a peripheral edge of an opening of the cavity (25) is a first specific point An, a second specific point Bn is present on a line that passes through the first specific point An and is parallel to a lower face of a cylinder head (16) in the fuel injection cross-section Sn, a third specific point Cn is present on a bottom wall portion (25c) of the cavity (25) in the fuel injection cross-section Sn, the second specific point Bn is positioned closer to the piston central axis (Lp) than is the first specific point An, the third specific point Cn is positioned closer to the piston central axis (Lp) than is a position where the bottom wall portion (25c) of the cavity (25) has a maximum outer diameter, and a cross-sectional shape surrounded by a pathway AnBn connecting the first and second specific points An and Bn via a line along the lower face of the cylinder head (16) in the fuel injection cross-section Sn, a pathway AnCn connecting the first and third specific points An and Cn along a wall face of the cavity (25) in the fuel injection cross-section Sn, and a pathway BnCn connecting the second and third specific points Bn and Cn via the shortest straight line is substantially identical for each fuel injection cross-section Sn.

2. The direct fuel injection diesel engine according to claim 1, wherein the fuel injection cross-section Sn is substantially perpendicular to the top face of the piston (13).

3. The direct fuel injection diesel engine according to claim 1 or claim 2, wherein a top portion (25d) protruding toward the opening of the cavity (25) is formed in the middle of the wall face of the cavity (25), and the third specific point Cn is positioned on the boundary of the top portion (25d) and the bottom wall portion (25c) connected to the radially outer side thereof.

4. The direct fuel injection diesel engine according to claim 1 or claim 2, wherein a cross-sectional shape of the cavity (25) that passes through any point in the circumferential direction of the cavity (25) and a fuel injection point (Oinj) of the fuel injector (23) present on the piston central axis (Lp) and is perpendicular to the top face of the piston (13) is substantially identical to the cross-sectional shape of each fuel injection cross-section Sn.

5. The direct fuel injection diesel engine according to claim 1 or claim 2, wherein fuel collision angles ($\alpha1$, $\alpha2$) at which the plurality of fuel injection axes (Li1 Li2) intersect the wall face of the cavity (25) are identical.

6. The direct fuel injection diesel engine according to of claim 1 or claim 2, wherein the distances from the fuel injection point (Oinj) of the fuel injector (23) to fuel collision points (P1, P2) where the plurality of fuel injection axes (Li1, Li2) intersect the wall face of the cavity (25) are identical.

* * * * *